(12) United States Patent
Wu et al.

(10) Patent No.: US 12,177,654 B2
(45) Date of Patent: Dec. 24, 2024

(54) CELL SELECTION OR RESELECTION METHOD AND DEVICE, AND TERMINAL

(71) Applicant: VIVO MOBILE COMMUNICATION CO., LTD., Guangdong (CN)

(72) Inventors: Yumin Wu, Dongguan (CN); Fei Yang, Dongguan (CN); Feng Zhu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 734 days.

(21) Appl. No.: 17/378,490

(22) Filed: Jul. 16, 2021

(65) Prior Publication Data

US 2021/0345209 A1    Nov. 4, 2021

Related U.S. Application Data

(63) Continuation of application No. PCT/CN2020/072704, filed on Jan. 17, 2020.

(30) Foreign Application Priority Data

Jan. 18, 2019 (CN) .......................... 201910108433.1

(51) Int. Cl.
| | |
|---|---|
| *H04W 36/08* | (2009.01) |
| *H04W 36/16* | (2009.01) |
| *H04W 36/24* | (2009.01) |
| *H04W 48/20* | (2009.01) |
| *H04W 36/14* | (2009.01) |
| *H04W 88/06* | (2009.01) |

(52) U.S. Cl.
CPC .......... *H04W 36/08* (2013.01); *H04W 36/16* (2013.01); *H04W 36/24* (2013.01); *H04W 48/20* (2013.01); *H04W 36/144* (2023.05); *H04W 36/1446* (2023.05); *H04W 88/06* (2013.01)

(58) Field of Classification Search
CPC ....... H04W 68/02; H04W 84/16; H04W 4/60; H04W 12/43; H04W 8/082
See application file for complete search history.

(56) References Cited

U.S. PATENT DOCUMENTS

| | | |
|---|---|---|
| 9,584,995 B2 | 2/2017 | Chuttani et al. |
| 9,967,808 B2 | 5/2018 | Chuttani et al. |

(Continued)

FOREIGN PATENT DOCUMENTS

| | | |
|---|---|---|
| CN | 102421130 A | 4/2012 |
| CN | 103370966 A | 10/2013 |

(Continued)

OTHER PUBLICATIONS

M.E. Dissertation, "Research Application of MCMM Software in Smart Phone". Beijing University of Technology, dated Dec. 2014.

(Continued)

*Primary Examiner* — Romani Ohri
(74) *Attorney, Agent, or Firm* — Harness, Dickey & Pierce, P.L.C.

(57) ABSTRACT

A cell selection or reselection method includes: when a first identifier of the terminal is in an idle state or an inactive state, determining a cell selection or reselection priority of the first identifier according to an operating cell of a second identifier of the terminal. The second identifier is different from the first identifier.

20 Claims, 2 Drawing Sheets

101

Determine, in a case that a first identifier of a terminal is in an idle state or an inactive state, a cell selection or reselection priority of the first identifier based on an operating cell of a second identifier of the terminal, where the second identifier is different from the first identifier (56) References Cited

U.S. PATENT DOCUMENTS

| | | |
|---|---|---|
| 2013/0331063 A1 | 12/2013 | Cormier et al. |
| 2014/0106750 A1 | 4/2014 | Roullier et al. |
| 2015/0350934 A1 | 12/2015 | Yang et al. |
| 2016/0295550 A1* | 10/2016 | Sharma ................ H04W 48/20 |
| 2016/0345149 A1 | 11/2016 | Chuttani et al. |
| 2016/0345244 A1 | 11/2016 | Chuttani et al. |
| 2016/0353516 A1 | 12/2016 | Rajurkar et al. |
| 2018/0249349 A1* | 8/2018 | Hu ........................ H04W 88/06 |
| 2018/0343638 A1* | 11/2018 | Balasubramanian ........................ H04W 74/0825 |
| 2020/0145911 A1* | 5/2020 | Ma .......................... H04W 8/24 |

FOREIGN PATENT DOCUMENTS

| | | |
|---|---|---|
| CN | 105282802 A | 1/2016 |
| CN | 106060794 A | 10/2016 |
| CN | 106170125 A | 11/2016 |
| CN | 106170147 A | 11/2016 |
| CN | 106416395 A | 2/2017 |
| CN | 108882321 A | 11/2018 |
| CN | 108886828 A | 11/2018 |
| WO | WO-2012041735 A1 | 4/2012 |
| WO | WO-2012142166 A1 | 10/2012 |
| WO | WO-2015054520 A1 | 4/2015 |
| WO | WO-2016191000 A1 | 12/2016 |
| WO | WO-2017124327 A1 | 7/2017 |
| WO | WO-2017213770 A1 | 12/2017 |

OTHER PUBLICATIONS

First Office Action of Chinese Priority Application No. 201910108433.1 dated Nov. 23, 2020. Translation provided by Bohui Intellectual Property.

Second Office Action of Chinese Priority Application No. 201910108433.1 dated May 19, 2021. Translation provided by Bohui Intellectual Property.

International Search Report and Written Opinion of the International Searching Authority regarding International Patent Application No. PCT/CN2020/072704, dated Mar. 27, 2020. Translation provided by Bohui Intellectual Property.

* cited by examiner

Determine, in a case that a first identifier of a terminal is in an idle state or an inactive state, a cell selection or reselection priority of the first identifier based on an operating cell of a second identifier of the terminal, where the second identifier is different from the first identifier

CELL SELECTION OR RESELECTION METHOD AND DEVICE, AND TERMINAL

CROSS-REFERENCE TO RELATED APPLICATIONS

This application is a Bypass Continuation Application of PCT/CN2020/072704 filed on Jan. 17, 2020, which claims priority to Chinese Patent Application No. 201910108433.1 filed on Jan. 18, 2019, which are incorporated herein by reference in their entirety.

TECHNICAL FIELD

This disclosure relates to the field of wireless communications technologies, and in particular, to a cell selection or reselection method, a device, and a terminal.

BACKGROUND

One user equipment (UE) may simultaneously have multiple subscriber identification module (SIM) cards inside it (that is, multi-SIM UE), or register with a network multiple times (that is, multi-registration UE). Such UE may camp on and/or establish connections in multiple cells simultaneously.

Different UEs may support different band capabilities. Due to limitation of the band capabilities, when a multi-SIM or multi-registration UE operates in multiple cells simultaneously, at least one card or one registered identifier is in an idle state (or an inactive state). As a result, the UE may be unable to receive or transmit signals in the multiple cells simultaneously, resulting in signal loss upon reception or transmission, and affecting wireless transmission performance.

SUMMARY

According to a first aspect, an embodiment of this disclosure provides a cell selection or reselection method, applied to a terminal and including:
  determining, in a case that a first identifier of the terminal is in an idle state or an inactive state, a cell selection or reselection priority of the first identifier based on an operating cell of a second identifier of the terminal, where the second identifier is different from the first identifier.

According to a second aspect, an embodiment of this disclosure provides a cell selection or reselection device, applied to a terminal and including:
  a processing module, configured to determine, in a case that a first identifier of the terminal is in an idle state or an inactive state, a cell selection or reselection priority of the first identifier based on an operating cell of a second identifier of the terminal, where the second identifier is different from the first identifier.

According to a third aspect, an embodiment of this disclosure provides a terminal, including a memory, a processor, and a program stored in the memory and capable of running on the processor, where when the program is executed by the processor, the steps of the foregoing cell selection or reselection method are implemented.

According to a fourth aspect, an embodiment of this disclosure provides a non-transitory computer-readable storage medium, where the non-transitory computer-readable storage medium stores a program, and when the program is executed by a processor, the steps of the foregoing cell selection or reselection method are implemented.

DESCRIPTION OF EMBODIMENTS

To make the to-be-resolved technical problems, technical solutions, and advantages of the embodiments of this disclosure clearer, the following provides detailed descriptions with reference to the accompanying drawings and specific embodiments.

One UE may simultaneously have multiple SIM cards inside it (that is, multi-SIM UE), or register with a network multiple times (that is, multi-registration UE). Such UE may camp on and/or establish connections in multiple cells simultaneously. In addition, such UE may simultaneously camps on and/or establish a connection to a same cell or different cells, and the radio access technologies of different cells may be the same or different. For example, the UE may camp on and/or establish connections to cell 1 and cell 2, where the radio access technology of cell 1 is 4-th generation (4G) long term evolution (LTE), and the radio access technology of cell 2 is 5-th generation (5G) new radio (NR).

Such UE may have different operating states in multiple operating cells. For example, the UE operates simultaneously in two cells, a state of the UE in cell 1 may be IDLE (an idle state) (or INACTIVE (an inactive state), or CONNECTED (a connected state)), and a state of the UE in cell 2 may be IDLE (or INACTIVE, or CONNECTED).

In addition, the UE may have different UE identifiers in multiple operating cells. For example, the UE has a system architecture evolution (SAE)-temporary mobile station identifier (TMSI) (1) (i.e., S-TMSI (1)) in cell 1, and has an S-TMSI (2) in cell 2.

Different UEs may have different band capabilities, including: a band supported by UE (for example, band1) and a band combination supported by UE (for example, band1 and band2). A band combination supported by UE may distinguishably include: a combination of synchronized bands supported by UE, and a combination of unsynchronized bands supported by UE. "A combination of synchronized bands" means that when the UE operates in multiple cells (or frequencies) simultaneously, the multiple cells (or frequencies) must be in a synchronized state. For example, the subframe boundaries of the multiple cells must meet a synchronization requirement (for example, a subframe boundary offset is less than or equal to 30.26 s). "A combination of unsynchronized bands" means that when the UE operates in multiple cells (or frequencies) simultaneously, the multiple cells (or frequencies) may be in an unsynchronized state. For example, the subframe boundaries of the multiple cells may not meet a synchronization requirement (for example, a subframe boundary offset is greater than 30.26 s). Certainly, when the UE supports "a combination of unsynchronized bands", by default, the UE can also operate in a synchronized state, which means multiple cells in "the combination of unsynchronized bands" that the UE operates in simultaneously may also be in a synchronized state.

An IDLE UE needs to camp on a cell to receive a paging message from a network side and initiate a connection establishment procedure in the camp cell. The procedures to search for a cell to camp on include: cell selection and cell reselection.

Cell selection is used to select a cell that UE may camp on when the UE does not yet camp on a cell. A cell selection criterion is referred to as criterion S. After channel quality of a cell meets the criterion S (for example, the channel quality is greater than a preset threshold), the cell may be selected as a camp cell. Cell reselection is used to change, in a case that the UE has already camped on a cell, the UE to another cell that can be camped on due to movement. Cell reselection includes: intra-frequency and equal priority inter-frequency cell reselection; and different priority inter-frequency cell reselection.

For "intra-frequency and equal priority inter-frequency cell reselection", the criterion R is employed. Content of the criterion R is as follows: signal quality Rs is used for a serving cell, and signal quality Rn is used for a neighboring cell, and a target cell to be reselected for the UE is a cell with the best signal quality (that is, a largest value of Rs and Rn). The "different priority inter-frequency cell reselection" is performed by network-configured priority. In a case that value S (for example, Squal or Srxlev) of a high-priority cell is greater than a network-configured threshold (for example, ThreshX, HighQ, or ThreshX, HighP), and the duration is longer than a network-configured threshold (for example, TreselectionRAT), the UE reselects to the high-priority cell.

Due to limitation of the band capabilities, when a multi-SIM or multi-registration UE operates in multiple cells simultaneously, at least one card or one registered identifier is in an idle state (or an inactive state). As a result, the UE may be unable to receive or transmit signals in the multiple cells simultaneously, resulting in signal loss upon reception or transmission, and affecting wireless transmission performance.

To resolve the above-mentioned problem, embodiments of this disclosure provide a cell selection or reselection method, a device, and a terminal, enabling a terminal to operate simultaneously in multiple cells.

Figure 1:
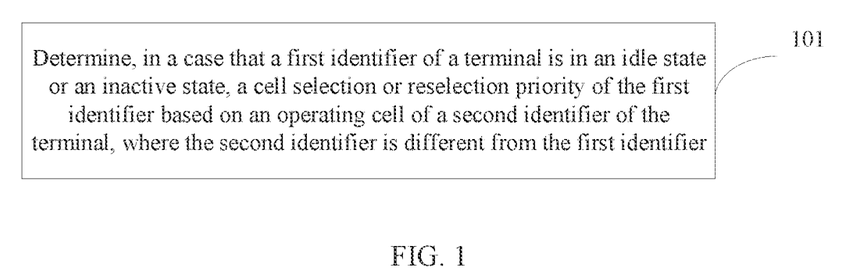
FIG. 1 is a schematic flowchart of a cell selection or reselection method according to an embodiment of this disclosure.

As shown in FIG. 1, an embodiment of this disclosure provides a cell selection or reselection method, applied to a terminal and including:

Step 101: Determine, in a case that a first identifier of the terminal is in an idle state or an inactive state, a cell selection or reselection priority of the first identifier based on an operating cell of a second identifier of the terminal, where the second identifier is different from the first identifier.

In this embodiment, when the terminal has multiple identifiers, and a first identifier is in an idle state or an inactive state, a cell selection or reselection priority of the first identifier is determined based on an operating cell of a second identifier of the terminal. In this way, when a multi-SIM or multi-registration terminal in an idle state (or an inactive state) is about to operate simultaneously in multiple cells, the terminal can camp on a cell corresponding to a band or a band combination supported by the terminal, so that the terminal can operate simultaneously in the multiple cells, for example, receiving or transmitting signals simultaneously.

Optionally, the determining a cell selection or reselection priority of the first identifier based on an operating cell of a second identifier of the terminal includes:

increasing, in a cell selection or reselection process of the first identifier, a priority of a target cell and/or a frequency and/or a band that satisfies a preset relationship with the operating cell of the second identifier, where the preset relationship includes at least one of:
being the same as the operating cell of the second identifier;
having a same frequency as the operating cell of the second identifier;
having a same band as the operating cell of the second identifier;
a combination of a band of a target cell for cell selection or reselection of the first identifier and a band of the operating cell of the second identifier being a band combination supported by the terminal;
supporting a same radio access technology as the operating cell of the second identifier; or
a combination of a radio access technology supported by a target cell for cell selection or reselection of the first identifier and a radio access technology supported by the operating cell of the second identifier being a combination of radio access technologies supported by the terminal.

Optionally, the increasing a priority of a target cell and/or a frequency and/or a band that satisfies a preset relationship with the operating cell of the second identifier includes:
adjusting the priority of the target cell and/or the frequency and/or the band that satisfies a preset relationship with the operating cell of the second identifier to the highest level.

In a cell selection or reselection process of the first identifier, if the priority of the target cell which is the same as the operating cell of the second identifier is set to the highest level, the operating cell of the first identifier may be the same as the operating cell of the second identifier, enabling the terminal to operate simultaneously in the operating cell of the first cell and the operating cell of the second identifier. In a cell selection or reselection process of the first identifier, if the priority of the target cell which has a same frequency as the operating cell of the second identifier is set to the highest level, the frequency of the operating cell of the first identifier may be the same as the frequency of the operating cell of the second identifier, enabling the terminal to operate simultaneously in the operating cell of the first cell and the operating cell of the second identifier. In a cell selection or reselection process of the first identifier, if the priority of the target cell which has a same band as the operating cell of the second identifier is set to the highest level, the band of the operating cell of the first identifier may be the same as the band of the operating cell of the second identifier, enabling the terminal to operate simultaneously in the operating cell of the first cell and the operating cell of the second identifier. If the combination of the band of the target cell for cell selection or reselection of the first identifier and the band of the operating cell of the second identifier is the band combination supported by the terminal, setting the priority of the target cell to the highest level may also allow the terminal to operate simultaneously in the operating cell of the first identifier and the operating cell of the second identifier. In a cell selection or reselection process of the first identifier, if the priority of the target cell which has a same radio access technology as that supported by the operating cell of the second identifier is set to the highest level, a radio access technology supported by the operating cell of the first identifier may be the same as the radio access technology supported by the operating cell of the second identifier, enabling the terminal to operate simultaneously in the operating cell of the first cell and the operating cell of the second identifier. If the combination of the radio access technology supported by the target cell for cell selection or reselection of the first identifier and the radio access technology supported by the operating cell of the second identifier is the combination of radio access technologies supported by the terminal, setting the priority of the target cell to the highest level may also allow the terminal to operate simultaneously in the operating cell of the first identifier and the operating cell of the second identifier.

Optionally, the combination of radio access technologies supported by the terminal includes at least one of:
  code division multiple access (CDMA);
  CDMA2000;
  global system for mobile communications (GSM)/enhanced data rates for GSM evolution radio access network (GERAN);
  universal mobile telecommunications system (UMTS) terrestrial radio access network (UTRAN);
  evolved UTRAN (E-UTRAN);
  5G new radio (NR);
  Wi-Fi; or
  Bluetooth.

Optionally, the band combination supported by the terminal includes at least one of:
  a combination of synchronized bands supported by the terminal; or
  a combination of unsynchronized bands supported by the terminal.

Optionally, when the preset relationship is that the combination of the band of the target cell for cell selection or reselection of the first identifier and the band of the operating cell of the second identifier is the combination of synchronized bands supported by the terminal, the increasing a priority of a target cell and/or a frequency and/or a band that satisfies a preset relationship with an operating cell of the second identifier includes:
  increasing a priority of a target cell that is synchronized with the operating cell of the second identifier, and/or a frequency corresponding to the target cell, and/or a band corresponding to the target cell.

Optionally, when the second identifier of the terminal is in a connected state, the operating cell of the second identifier is a current serving cell or a target cell to be switched; and
  when the second identifier of the terminal is in an idle state or an inactive state, the operating cell of the second identifier is a camp cell, or a target cell to be selected or reselected.

Before the determining a cell selection or reselection priority of the first identifier based on an operating cell of a second identifier of the terminal, the method further includes:
  obtaining multiple identifiers from a network side through registration or attachment, where the multiple identifiers include the first identifier and the second identifier.

Optionally, the identifiers include at least one of:
  a subscriber identification module (SIM) card number;
  an international mobile subscriber identity (IMSI);
  a temporary mobile subscriber identity (TMSI);
  a system architecture evolution temporary mobile subscriber identity (S-TMSI);
  a 5G-S-TMSI; or
  a radio network temporary identity (RNTI).

Optionally, the multiple identifiers are in a same connection state or in different connection states.

The cell selection or reselection method according to this disclosure is described below with reference to specific embodiments. The cell selection or reselection method of this embodiment includes the following steps.

Step 1: One UE obtains multiple pieces of identifier information from a network side, where
  the multiple pieces of identifier information may be obtained by having one SIM card registered with or attached to a network side multiple times, or the multiple pieces of identifier information may be obtained by having multiple SIM cards registered with or attached to a network side.

In a example, UE obtains UE (UE-ID-1) and UE (UE-ID-2) by having one or more SIM cards registered with or attached to a network side multiple times.

The multiple pieces of identifier information include any one or a combination of the following:
  a SIM card number;
  an international mobile subscriber identity (IMSI);
  a temporary mobile subscriber identity (TMSI);
  a system architecture evolution-TMSI (S-TMSI);
  a 5G-S-TMSI; and
  an radio network temporary identity (RNTI), where
    the multiple identifiers of the UE may be in a same connection state or in different connection states. For example, UE (UE-ID-1) is in an idle state, and UE (UE-ID-2) is in a connected state.

Step 2: When at least one identifier of the UE is in an idle state (that is, IDLE) or an inactive state (that is, INACTIVE), for example, UE (UE-ID-1) is in an idle state, the UE identifier executes a specified cell selection or reselection criterion based on an operating cell (and/or a frequency, and/or a band) of another UE identifier.

The "operating cell" of the another UE identifier represents a serving cell (or a target cell to be switched (for example, a target cell 2 to be switched), or a target cell to be changed to (for example, a target secondary cell (SCell)-2 for the UE identifier in a connected state, or represents a camp cell (or a target cell to be selected or reselected) for UE in an idle state or an inactive state.

The "specified cell selection or reselection criterion" includes at least one of:
  a. A same cell is selected in priority.
  For example, in a case that UE (UE-ID-1) is operating in cell 1, including that: UE (UE-ID-1) is in an IDLE state, an INACTIVE state, or a CONNECTED state in cell 1, UE (UE-ID-2) in an IDLE or INACTIVE state preferentially selects cell 1 in cell selection or reselection.
  b: A same frequency is selected in priority.
  For example, in a case that UE (UE-ID-1) is operating in cell 1, including that: UE (UE-ID-1) is in an IDLE state, an INACTIVE state, or a CONNECTED state in cell 1, and a frequency for cell 1 is f1, UE (UE-ID-2) in an IDLE or INACTIVE state preferentially selects f1 or a cell corresponding to f1 in cell selection or reselection.
  c. A same band is selected in priority.
  For example, in a case that UE (UE-ID-1) is operating in cell 1, including that: UE (UE-ID-1) is in an IDLE state, an INACTIVE state, or a CONNECTED state in cell 1, and a band of cell 1 is band1, UE (UE-ID-2) in an IDLE or INACTIVE state preferentially selects a frequency or a cell corresponding to band1 in cell selection or reselection.
  d. A band combination supported by UE is selected in priority.
  For example, in a case that UE (UE-ID-1) is operating in cell 1, including that: UE (UE-ID-1) is in an IDLE state, an INACTIVE state, or a CONNECTED state in cell 1, a band of cell 1 is band1, and a band combination supported by UE includes (band1 and band2) and (band1 and band3), UE (UE-ID-2) in an IDLE or INACTIVE state preferentially selects a frequency or a cell corresponding to band2 or band3 in cell selection or reselection.

e. A same radio access technology is selected in priority.

For example, in a case that UE (UE-ID-1) is operating in LTE, UE (UE-ID-2) in an IDLE or INACTIVE state preferentially selects an LTE cell in cell selection or reselection.

f. A combination of radio access technologies supported by UE is selected in priority.

For example, in a case that UE (UE-ID-1) is operating in cell 1, including that: UE (UE-ID-1) is in an IDLE state, an INACTIVE state, or a CONNECTED state in cell 1, the radio access technology of cell 1 is LTE, and a combination of radio access technologies supported by UE includes LTE and 5G NR, UE (UE-ID-2) in an IDLE or INACTIVE state preferentially selects a frequency or a cell corresponding to 5G NR in cell selection or reselection.

The "combination of radio access technologies" includes any one or a combination of the following: CDMA; CDMA2000; GERAN; E-UTRAN (for example, LTE); UTRAN (for example, WCDMA or TDS-CDMA); 5G NR; Wi-Fi; and Bluetooth.

The "band combination supported by UE" is a combination of bands of multiple cells in which the multiple UE identifiers are capable of operating simultaneously. Optionally, the "band combination supported by UE" may distinguishably include: a combination of synchronized bands supported by UE, and a combination of unsynchronized bands supported by UE.

The "combination of synchronized bands" means that when the UE operates in multiple cells (or frequencies) simultaneously, the multiple cells (or frequencies) must be in a synchronized state. For example, the subframe boundaries of the multiple cells must meet a synchronization requirement (for example, a subframe boundary offset is less than or equal to 30.26 s).

The "combination of unsynchronized bands" means that when the UE operates in multiple cells (or frequencies) simultaneously, the multiple cells (or frequencies) may be in an unsynchronized state. For example, the subframe boundaries of the multiple cells may not meet a synchronization requirement (for example, a subframe boundary offset is greater than 30.26 s).

Optionally, in a case that "a band combination supported by UE is selected in priority", if the band combination supported by UE is a combination of synchronized bands, the multiple cells need to be in a synchronized state when the UE preferentially selects the combination of synchronized bands in cell selection or reselection. For example, in a case that UE (UE-ID-1) is operating in cell 1, including that: UE (UE-ID-1) is in an IDLE state, an INACTIVE state, or a CONNECTED state in cell 1, a band of cell 1 is band1, and a combination of synchronized bands supported by UE includes (band1 and band2) and (band1 and band3), UE (UE-ID-2) in an IDLE or INACTIVE state preferentially selects a frequency or a cell corresponding to band2 or band3 in cell selection or reselection if cell 2 (or cell 3) corresponding to band2 (or band3) and cell 1 are in a synchronized state.

Figure 2:
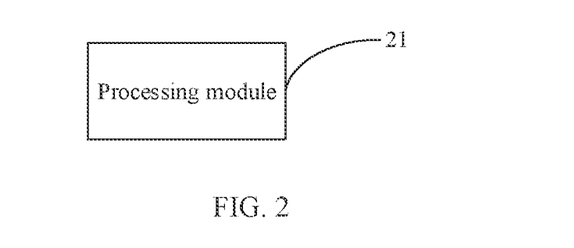
FIG. 2 is a structural block diagram of a cell selection or reselection device according to an embodiment of this disclosure.

As shown in FIG. 2, an embodiment of this disclosure further provides a cell selection or reselection method, applied to a terminal and including:

a processing module 21, configured to determine, in a case that a first identifier of the terminal is in an idle state or an inactive state, a cell selection or reselection priority of the first identifier based on an operating cell of a second identifier of the terminal, where the second identifier is different from the first identifier.

In this embodiment, when the terminal has multiple identifiers, and a first identifier is in an idle state or an inactive state, a cell selection or reselection priority of the first identifier is determined based on an operating cell of a second identifier of the terminal. In this way, when a multi-SIM or multi-registration terminal in an idle state (or an inactive state) is about to operate simultaneously in multiple cells, the terminal can camp on a cell corresponding to a band or a band combination supported by the terminal, so that the terminal can operate simultaneously in the multiple cells, for example, receiving or transmitting signals simultaneously.

Optionally, the processing module 21 is specifically configured to increase, in a cell selection or reselection process of the first identifier, a priority of a target cell and/or a frequency and/or a band that satisfies a preset relationship with the operating cell of the second identifier, where the preset relationship includes at least one of:

being the same as the operating cell of the second identifier;

having a same frequency as the operating cell of the second identifier;

having a same band as the operating cell of the second identifier;

a combination of a band of a target cell for cell selection or reselection of the first identifier and a band of the operating cell of the second identifier being a band combination supported by the terminal;

supporting a same radio access technology as the operating cell of the second identifier; or     a combination of a radio access technology supported by a target cell for cell selection or reselection of the first identifier and a radio access technology supported by the operating cell of the second identifier being a combination of radio access technologies supported by the terminal.

Optionally, the processing module 21 is specifically configured to adjust the priority of the target cell and/or the frequency and/or the band that satisfies a preset relationship with the operating cell of the second identifier to the highest level.

Optionally, the combination of radio access technologies supported by the terminal includes at least one of:

code division multiple access (CDMA);

CDMA2000;

global system for mobile communications (GSM)/enhanced data rates for GSM evolution radio access network (GERAN);

universal mobile telecommunications system (UMTS) terrestrial radio access network (UTRAN);

evolved UTRAN (E-UTRAN);

5G new radio (NR);

Wi-Fi; or

Bluetooth.

Optionally, the band combination supported by the terminal includes at least one of:

a combination of synchronized bands supported by the terminal; or     a combination of unsynchronized bands supported by the terminal.

Optionally, when the preset relationship is that the combination of the band of the target cell for cell selection or reselection of the first identifier and the band of the operating cell of the second identifier is the combination of synchronized bands supported by the terminal, the processing module 21 is specifically configured to increase a priority of a target cell that is synchronized with the operating cell of the second identifier, and/or a frequency corresponding to the target cell, and/or a band corresponding to the target cell.

Optionally, when the second identifier of the terminal is in a connected state, the operating cell of the second identifier is a current serving cell or a target cell to be switched; and when the second identifier of the terminal is in an idle state or an inactive state, the operating cell of the second identifier is a camp cell, or a target cell to be selected or reselected.

The device further includes:

an obtaining module, configured to obtain multiple identifiers from a network side through registration or attachment, where the multiple identifiers include the first identifier and the second identifier.

Optionally, the identifiers include at least one of:

a subscriber identification module (SIM) card number;
an international mobile subscriber identity (IMSI);
a temporary mobile subscriber identity (TMSI);
a system architecture evolution temporary mobile subscriber identity (S-TMSI);
a 5G-S-TMSI; or
a radio network temporary identity (RNTI).

Optionally, the multiple identifiers are in a same connection state or in different connection states.

An embodiment of this disclosure further provides a terminal, including a memory, a processor, and a program stored in the memory and capable of running on the processor, where when the program is executed by the processor, the steps of the foregoing cell selection or reselection method are implemented.

Figure 3:
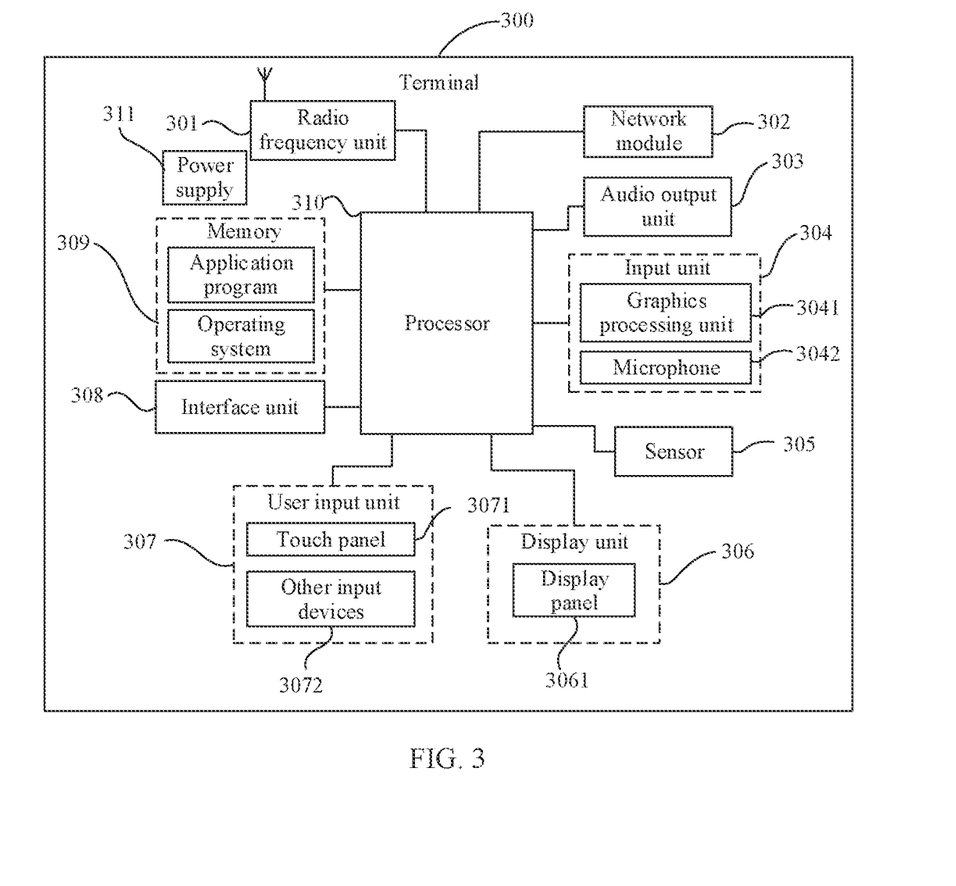
FIG. 3 is a schematic diagram of composition of a terminal according to an embodiment of this disclosure.

As shown in FIG. 3, the terminal 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art may understand that the structure of the terminal shown in FIG. 3 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The processor 310 is configured to determine, in a case that a first identifier of the terminal is in an idle state or an inactive state, a cell selection or reselection priority of the first identifier based on an operating cell of a second identifier of the terminal, where the second identifier is different from the first identifier.

In some optional embodiments, the processor 310 is specifically configured to increase, in a cell selection or reselection process of the first identifier, a priority of a target cell and/or a frequency and/or a band that satisfies a preset relationship with an operating cell of the second identifier, where the preset relationship includes at least one of:

being the same as the operating cell of the second identifier;
having a same frequency as the operating cell of the second identifier;
having a same band as the operating cell of the second identifier;
a combination of a band of a target cell for cell selection or reselection of the first identifier and a band of the operating cell of the second identifier being a band combination supported by the terminal;
supporting a same radio access technology as the operating cell of the second identifier; or
a combination of a radio access technology supported by a target cell for cell selection or reselection of the first identifier and a radio access technology supported by the operating cell of the second identifier being a combination of radio access technologies supported by the terminal.

In some optional embodiments, the processor 310 is specifically configured to adjust the priority of the target cell and/or the frequency and/or the band that satisfies a preset relationship with the operating cell of the second identifier to the highest level.

Optionally, the combination of radio access technologies supported by the terminal includes at least one of:

code division multiple access (CDMA);
CDMA2000;
global system for mobile communications (GSM)/enhanced data rates for GSM evolution radio access network (GERAN);
universal mobile telecommunications system (UMTS) terrestrial radio access network (UTRAN);
evolved UTRAN (E-UTRAN);
5G new radio (NR);
Wi-Fi; or
Bluetooth.

Optionally, the band combination supported by the terminal includes at least one of:

a combination of synchronized bands supported by the terminal; or
a combination of unsynchronized bands supported by the terminal.

Optionally, when the second identifier of the terminal is in a connected state, the operating cell of the second identifier is a current serving cell or a target cell to be switched; and when the second identifier of the terminal is in an idle state or an inactive state, the operating cell of the second identifier is a camp cell, or a target cell to be selected or reselected.

The processor 310 is further configured to obtain multiple identifiers from a network side through registration or attachment, where the multiple identifiers include the first identifier and the second identifier.

Optionally, the identifiers include at least one of:

a subscriber identification module (SIM) card number;
an international mobile subscriber identity (IMSI);
a temporary mobile subscriber identity (TMSI);
a system architecture evolution temporary mobile subscriber identity (S-TMSI);
a 5G-S-TMSI; or
a radio network temporary identity (RNTI).

Optionally, the multiple identifiers are in a same connection state or in different connection states.

It should be understood that, in this embodiment of this disclosure, the radio frequency unit 301 may be configured to transmit or receive a signal in an information transmitting/receiving or call process. For example, the radio frequency unit 301 receives downlink data from a base station and transmits the downlink data to the processor 310 for processing; and transmits uplink data to the base station. Generally, the radio frequency unit 301 includes but is not limited to an antenna, at least one amplifier, a transceiver, a coupler, a low noise amplifier, a duplexer, and the like. In addition, the radio frequency unit 301 may further communicate with a network and another device through a wireless communications system.

The terminal provides wireless broadband internet access for a user by using the network module 302, for example, helps the user send and receive e-mails, browse web pages, and access streaming media.

The audio output unit 303 may convert audio data received by the radio frequency unit 301 or the network module 302 or stored in the memory 309 into an audio signal and output the audio signal as a sound. In addition, the audio output unit 303 may further provide audio output (for example, a call signal reception tone or a message reception tone) that is related to a specific function performed by the terminal 300. The audio output unit 303 includes a speaker, a buzzer, a receiver, and the like.

The input unit 304 is configured to receive an audio signal or a video signal. The input unit 304 may include a graphics processing unit (GPU) 3041 and a microphone 3042, and the graphics processing unit 3041 processes image data of a static picture or a video obtained by an image capture apparatus (for example, a camera) in an image capture mode or a video capture mode. A processed image frame may be displayed on the display unit 306. An image frame processed by the graphics processing unit 3041 may be stored in the memory 309 (or another storage medium) or transmitted by the radio frequency unit 301 or the network module 302. The microphone 3042 may receive a sound, and can process the sound into audio data. The processed audio data may be converted in a telephone call mode into a format that can be transmitted by the radio frequency unit 301 to a mobile communications base station, for outputting.

The terminal 300 further includes at least one sensor 305, for example, an optical sensor, a motion sensor, and other sensors. For example, the optical sensor includes an ambient light sensor and a proximity sensor. The ambient light sensor may adjust brightness of a display panel 3031 based on intensity of ambient light. When the terminal 300 moves near an ear, the proximity sensor may shut down the display panel 3031 and/or backlight. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as a pedometer and tapping), and the like. The sensor 305 may also include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information input by the user or information provided for the user. The display unit 306 may include the display panel 3031, and the display panel 3031 may be configured in a form of a liquid crystal display (LCD), an organic light-emitting diode (OLED), or the like.

The user input unit 307 may be configured to receive input digit or character information, and generate key signal input that is related to user setting and function control of the terminal. For example, the user input unit 307 includes a touch panel 3071 and other input devices 3072. The touch panel 3071, also referred to as a touchscreen, may capture a touch operation performed by a user on or near the touch panel (for example, an operation performed by the user on the touch panel 3071 or near the touch panel 3071 by using any appropriate object or accessory such as a finger or a stylus). The touch panel 3071 may include two parts: a touch detection apparatus and a touch controller. The touch detection apparatus detects a touch location of the user, detects a signal carried by a touch operation, and transmits the signal to the touch controller. The touch controller receives touch information from the touch detection apparatus, converts the touch information into point coordinates, transmits the point coordinates to the processor 310, and receives and executes a command transmitted by the processor 310. In addition, the touch panel 3071 may be implemented in multiple types, for example, as a resistive, capacitive, infrared, or surface acoustic wave touch panel. In addition to the touch panel 3071, the user input unit 307 may further include the other input devices 3072. For example, the other input devices 3072 may include but are not limited to a physical keyboard, a function key (for example, a volume control key or a power on/off key), a trackball, a mouse, a joystick, and the like. Details are not described herein.

Further, the touch panel 3071 may cover the display panel 3031. After detecting a touch operation on or near the touch panel 3071, the touch panel 3071 transmits the touch operation to the processor 310 to determine a type of a touch event. Then the processor 310 provides corresponding visual output on the display panel 3031 based on the type of the touch event. Although the touch panel 3071 and the display panel 3031 are used as two separate components to implement input and output functions of the terminal in FIG. 3, the touch panel 3071 and the display panel 3031 may be integrated to implement the input and output functions of the terminal in some embodiments. This is not specifically limited herein.

The interface unit 308 is an interface for connecting an external apparatus to the terminal 300. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 308 may be configured to receive input (for example, data information and electric power) from the external apparatus, and transmit the received input to one or more elements in the terminal 300; or may be configured to transmit data between the terminal 300 and the external apparatus.

The memory 309 may be configured to store software programs and various types of data. The memory 309 may mainly include a program storage area and a data storage area. The program storage area may store an operating system, an application program required by at least one function (for example, an audio play function or an image play function), and the like. The data storage area may store data (for example, audio data and a phone book) created based on usage of the mobile phone. In addition, the memory 309 may include a high-speed random access memory, and may further include a non-volatile memory, for example, at least one disk storage device, a flash memory device, or other volatile solid-state storage devices.

The processor 310 is a control center of the terminal, and is connected to all components of the terminal by using various interfaces and lines. By running or executing a software program and/or a module stored in the memory 309 and invoking data stored in the memory 309, the processor 310 executes various functions of the terminal and processes data, so as to perform overall monitoring on the terminal. The processor 310 may include one or more processing units. Optionally, the processor 310 may integrate an application processor and a modem processor. The application processor mainly processes an operating system, a user interface, an application program, and the like. The modem processor mainly processes wireless communication. It may be understood that the modem processor may alternatively not be integrated into the processor 310.

The terminal 300 may further include a power supply 311 (for example, a battery) that supplies power to the components. Optionally, the power supply 311 may be logically connected to the processor 310 by using a power management system, so as to implement functions such as charging management, discharging management, and power consumption management by using the power management system.

In addition, the terminal 300 includes some functional modules that are not shown. Details are not described herein.

An embodiment of this disclosure further provides a non-transitory computer-readable storage medium, where the non-transitory computer-readable storage medium stores a program, and when the program is executed by a processor, the steps of the foregoing cell selection or reselection method are implemented.

It can be understood that the embodiments described in this specification may be implemented by hardware, software, firmware, middleware, microcode, or a combination thereof. For hardware implementation, the processing unit may be implemented in one or more application-specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for performing the functions described in this application, or a combination thereof.

For software implementation, the technology described herein may be implemented by executing modules (for example, procedures and functions) of the functions described herein. Software code may be stored in the memory and executed by the processor. The memory may be implemented inside the processor or outside the processor.

All embodiments in this specification are described in a progressive manner. Each embodiment focuses on differences from other embodiments. For the part that is the same or similar between different embodiments, reference may be made between the embodiments.

A person skilled in the art should understand that the embodiments of this disclosure may be provided as a method, a device, or a program product. Therefore, the embodiments of this disclosure may be hardware-only embodiments, software-only embodiments, or embodiments with a combination of software and hardware. Moreover, the embodiments of this disclosure may use a form of a computer program product that is implemented on one or more computer-usable storage media (including but not limited to a disk memory, a CD-ROM, an optical memory, and the like) that include computer usable program code.

The embodiments of this disclosure are described with reference to the flowcharts and/or block diagrams of the method, the user equipment (system), and the program product according to the embodiments of this disclosure. It should be understood that program instructions may be used to implement each process and/or each block in the flowcharts and/or the block diagrams, or a combination of a process and/or a block in the flowcharts and/or the block diagrams. These program instructions may be provided to a general-purpose computer, a special-purpose computer, an embedded processor, or a processor of any other programmable data processing user equipment to generate a machine, so that the instructions executed by a computer or a processor of any other programmable data processing user equipment generate an apparatus for implementing a specific function in one or more processes in the flowcharts and/or in one or more blocks in the block diagrams.

These program instructions may be stored in a computer-readable memory that can instruct the computer or any other programmable data processing user equipment to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These program instructions may be loaded onto a computer or other programmable data processing user equipment, so that a series of operations and steps are performed on the computer or the other programmable user equipment, thereby generating computer-implemented processing. Therefore, the instructions executed on the computer or the other programmable user equipment provide steps for implementing the functions specified in one or more processes in the flowcharts and/or in one or more blocks in the block diagrams.

Although some optional embodiments in the embodiments of this disclosure have been described, persons skilled in the art can make changes and modifications to these embodiments once they learn the basic inventive concept. Therefore, the following claims are intended to be construed as to cover the optional embodiments and all changes and modifications falling within the scope of the embodiments of this disclosure.

It should be further noted that in this specification, relational terms such as "first" and "second" are only used to distinguish one entity or operation from another, and do not necessarily require or imply that any actual relationship or sequence exists between these entities or operations. Moreover, the terms "include", "comprise", or any of their variants are intended to cover a non-exclusive inclusion, such that a process, a method, an article, or user equipment that includes a list of elements not only includes those elements but also includes other elements that are not expressly listed, or further includes elements inherent to such a process, method, article, or user equipment. In absence of more constraints, an element preceded by "includes a . . . " does not preclude the existence of other identical elements in the process, method, article, or user equipment that includes the element.

In addition, the use of "and/or" in this application represents presence of at least one of the connected objects. For example, A and/or B and/or C represents the following seven cases: A alone, B alone, C alone, both A and B, both B and C, both A and C, and all of A, B, and C. Similarly, in the specification and claims, the use of "at least one of A and B" should be interpreted as: "A alone, B alone, or both A and B".

The foregoing descriptions are merely optional implementations of this disclosure. It should be noted that a person of ordinary skill in the art may make several improvements or polishing without departing from the principle of this disclosure and the improvements and polishing shall fall within the protection scope of this disclosure.

What is claimed is:

1. A cell selection or reselection method, applied to a terminal and comprising:
    determining, in a case that a first identifier of the terminal is in an idle state or an inactive state, a cell selection or reselection priority of the first identifier based on an operating cell of a second identifier of the terminal, wherein the second identifier is different from the first identifier;

wherein the determining a cell selection or reselection priority of the first identifier based on an operating cell of a second identifier of the terminal comprises:
increasing, in a cell selection or reselection process of the first identifier, a priority of at least one of a target cell or a band that satisfies a preset relationship with the operating cell of the second identifier, wherein the preset relationship comprises at least one of:
having a same band as the operating cell of the second identifier;
a combination of a band of a target cell for cell selection or reselection of the first identifier and a band of the operating cell of the second identifier being a band combination supported by the terminal;
supporting a same radio access technology as the operating cell of the second identifier; or
a combination of a radio access technology supported by a target cell for cell selection or reselection of the first identifier and a radio access technology supported by the operating cell of the second identifier being a combination of radio access technologies supported by the terminal.

2. The cell selection or reselection method according to claim 1, wherein the increasing a priority of at least one of a target cell or a band that satisfies a preset relationship with the operating cell of the second identifier comprises:
adjusting the priority of at least one of a target cell or a band that satisfies a preset relationship with the operating cell of the second identifier to highest level.

3. The cell selection or reselection method according to claim 1, wherein the combination of radio access technologies supported by the terminal comprises at least one of:
code division multiple access (CDMA);
CDMA2000;
global system for mobile communications (GSM)/enhanced data rates for GSM evolution radio access network (GERAN);
universal mobile telecommunications system (UMTS) terrestrial radio access network (UTRAN);
evolved UTRAN (E-UTRAN);
5G new radio (NR);
Wi-Fi; or
Bluetooth.

4. The cell selection or reselection method according to claim 1, wherein the band combination supported by the terminal comprises at least one of:
a combination of synchronized bands supported by the terminal; or
a combination of unsynchronized bands supported by the terminal.

5. The cell selection or reselection method according to claim 4, wherein when the preset relationship is that the combination of the band of the target cell for cell selection or reselection of the first identifier and the band of the operating cell of the second identifier is the combination of synchronized bands supported by the terminal, the increasing a priority of at least one of a target cell or a band that satisfies a preset relationship with the operating cell of the second identifier comprises:
increasing a priority of at least one of a target cell that is synchronized with the operating cell of the second identifier, or a band corresponding to the target cell.

6. The cell selection or reselection method according to claim 1, wherein
when the second identifier of the terminal is in a connected state, the operating cell of the second identifier is a current serving cell or a target cell to be switched; and
when the second identifier of the terminal is in an idle state or an inactive state, the operating cell of the second identifier is a camp cell, or a target cell to be selected or reselected.

7. The cell selection or reselection method according to claim 1, wherein before the determining a cell selection or reselection priority of the first identifier based on an operating cell of a second identifier of the terminal, the method further comprises:
obtaining multiple identifiers from a network side through registration or attachment, wherein the multiple identifiers comprise the first identifier and the second identifier.

8. The cell selection or reselection method according to claim 7, wherein the identifier comprises at least one of:
a subscriber identification module (SIM) card number;
an international mobile subscriber identity (IMSI);
a temporary mobile subscriber identity (TMSI);
a system architecture evolution temporary mobile subscriber identity (S-TMSI);
a 5G-S-TMSI; or
a radio network temporary identity (RNTI).

9. The cell selection or reselection method according to claim 7, wherein the multiple identifiers are in a same connection state or in different connection states.

10. A terminal, comprising a memory, a processor, and a program stored in the memory and executable on the processor, wherein the program, when executed by the processor, causes the processor to perform:
determining, in a case that a first identifier of the terminal is in an idle state or an inactive state, a cell selection or reselection priority of the first identifier based on an operating cell of a second identifier of the terminal, wherein the second identifier is different from the first identifier;
wherein the program, when executed by the processor, causes the processor to perform:
increasing, in a cell selection or reselection process of the first identifier, a priority of at least one of a target cell or a band that satisfies a preset relationship with the operating cell of the second identifier, wherein the preset relationship comprises at least one of:
having a same band as the operating cell of the second identifier;
a combination of a band of a target cell for cell selection or reselection of the first identifier and a band of the operating cell of the second identifier being a band combination supported by the terminal;
supporting a same radio access technology as the operating cell of the second identifier; or
a combination of a radio access technology supported by a target cell for cell selection or reselection of the first identifier and a radio access technology supported by the operating cell of the second identifier being a combination of radio access technologies supported by the terminal.

11. The terminal according to claim 10, wherein the program, when executed by the processor, causes the processor to perform:

adjusting the priority of at least one of a target cell or a band that satisfies a preset relationship with the operating cell of the second identifier to highest level.

12. The terminal according to claim 10, wherein the combination of radio access technologies supported by the terminal comprises at least one of:
  code division multiple access (CDMA);
  CDMA2000;
  global system for mobile communications (GSM)/enhanced data rates for GSM evolution radio access network (GERAN);
  universal mobile telecommunications system (UMTS) terrestrial radio access network (UTRAN);
  evolved UTRAN (E-UTRAN);
  5G new radio (NR);
  Wi-Fi; or
  Bluetooth.

13. The terminal according to claim 10, wherein the band combination supported by the terminal comprises at least one of:
  a combination of synchronized bands supported by the terminal; or
  a combination of unsynchronized bands supported by the terminal.

14. The terminal according to claim 13, wherein when the preset relationship is that the combination of the band of the target cell for cell selection or reselection of the first identifier and the band of the operating cell of the second identifier is the combination of synchronized bands supported by the terminal, the program, when executed by the processor, causes the processor to perform:
  increasing a priority of at least one of a target cell that is synchronized with the operating cell of the second identifier, or a band corresponding to the target cell.

15. The terminal according to claim 10, wherein
  when the second identifier of the terminal is in a connected state, the operating cell of the second identifier is a current serving cell or a target cell to be switched; and
  when the second identifier of the terminal is in an idle state or an inactive state, the operating cell of the second identifier is a camp cell, or a target cell to be selected or reselected.

16. The terminal according to claim 10, wherein before the processor performs the determining a cell selection or reselection priority of the first identifier based on an operating cell of a second identifier of the terminal, the program, when executed by the processor, causes the processor to further perform:
  obtaining multiple identifiers from a network side through registration or attachment, wherein the multiple identifiers comprise the first identifier and the second identifier.

17. The terminal according to claim 16, wherein the identifier comprises at least one of:
  a subscriber identification module (SIM) card number;
  an international mobile subscriber identity (IMSI);
  a temporary mobile subscriber identity (TMSI);
  a system architecture evolution temporary mobile subscriber identity (S-TMSI);
  a 5G-S-TMSI; or
  a radio network temporary identity (RNTI).

18. A non-transitory computer-readable storage medium, wherein the non-transitory computer-readable storage medium stores a computer program, and the computer program, when executed by a processor, causes the processor to perform:
  determining, in a case that a first identifier of a terminal is in an idle state or an inactive state, a cell selection or reselection priority of the first identifier based on an operating cell of a second identifier of the terminal, wherein the second identifier is different from the first identifier;
  wherein the computer program, when executed by the processor, causes the processor to perform:
    increasing, in a cell selection or reselection process of the first identifier, a priority of at least one of a target cell or a band that satisfies a preset relationship with the operating cell of the second identifier, wherein the preset relationship comprises at least one of:
    having a same band as the operating cell of the second identifier;
    a combination of a band of a target cell for cell selection or reselection of the first identifier and a band of the operating cell of the second identifier being a band combination supported by the terminal;
    supporting a same radio access technology as the operating cell of the second identifier; or
    a combination of a radio access technology supported by a target cell for cell selection or reselection of the first identifier and a radio access technology supported by the operating cell of the second identifier being a combination of radio access technologies supported by the terminal.

19. The non-transitory computer-readable storage medium according to claim 18, wherein the computer program, when executed by the processor, causes the processor to perform:
  adjusting the priority of at least one of a target cell or a band that satisfies a preset relationship with the operating cell of the second identifier to highest level.

20. The non-transitory computer-readable storage medium according to claim 18, wherein the combination of radio access technologies supported by the terminal comprises at least one of:
  code division multiple access (CDMA);
  CDMA2000;
  global system for mobile communications (GSM)/enhanced data rates for GSM evolution radio access network (GERAN);
  universal mobile telecommunications system (UMTS) terrestrial radio access network (UTRAN);
  evolved UTRAN (E-UTRAN);
  5G new radio (NR);
  Wi-Fi; or
  Bluetooth.

* * * * *